(12) United States Patent
Pantea et al.

(10) Patent No.: US 8,890,759 B2
(45) Date of Patent: Nov. 18, 2014

(54) HORN ANTENNA FOR A RADAR DEVICE

(71) Applicant: Siemens Aktiengesellschaft, Munich (DE)

(72) Inventors: Valentin Pantea, Newcastle (CA); Mihai-Gabriel Serban, North York (CA); Baljinder Singh, Peterborough (CA)

(73) Assignee: Siemens Aktiengesellschaft, Munich (DE)

( * ) Notice: Subject to any disclaimer, the term of this patent is extended or adjusted under 35 U.S.C. 154(b) by 189 days.

(21) Appl. No.: 13/655,829

(22) Filed: Oct. 19, 2012

(65) Prior Publication Data

US 2013/0099989 A1 Apr. 25, 2013

(30) Foreign Application Priority Data

Oct. 21, 2011 (EP) .................................... 11186194

(51) Int. Cl.
*H01Q 13/00* (2006.01)
*H01Q 19/08* (2006.01)
*G01F 23/284* (2006.01)
*H01Q 13/02* (2006.01)
*H01Q 1/22* (2006.01)

(52) U.S. Cl.
CPC .............. *H01Q 1/225* (2013.01); *H01Q 19/08* (2013.01); *G01F 23/284* (2013.01); *H01Q 13/0208* (2013.01)
USPC ............................. 343/783; 343/784; 343/786

(58) Field of Classification Search
USPC .......................................... 343/783, 784, 786
See application file for complete search history.

(56) References Cited

U.S. PATENT DOCUMENTS

| 4,106,026 | A | 8/1978 | Bui-Hai et al. |
| 6,661,389 | B2 | 12/2003 | Griessbaum et al. |
| 7,683,848 | B2 | 3/2010 | Gerding et al. |
| 7,872,610 | B2 * | 1/2011 | Motzer et al. ................ 343/785 |
| 2009/0212996 | A1 * | 8/2009 | Chen et al. .................... 342/124 |
| 2010/0079348 | A1 | 4/2010 | Dietmeier | |

FOREIGN PATENT DOCUMENTS

DE 202007018390 8/2008
EP 2 172 749 4/2010

\* cited by examiner

*Primary Examiner* — Robert Karacsony
(74) *Attorney, Agent, or Firm* — Cozen O'Connor

(57) ABSTRACT

A horn antenna for a radar device including a dielectric filling body arranged in a hollow horn section of a metal body and a dielectric cover attached to the filling body and sealingly closing the open end of the metal body. The filling body includes a first conical portion that is fittingly received in the hollow horn section, and a second conical portion that is situated away from the open end and dimensioned to leave a gap between itself and the wall of the hollow horn section. The dielectric filling body has a third portion between the first and second portions, where the third portion and the opposite portion of the wall of the hollow horn section are provided with circumferential grooves arranged in pairs opposite each other to provide a wear and maintenance-free attachment of the dielectric filling body in the horn antenna.

9 Claims, 1 Drawing Sheet

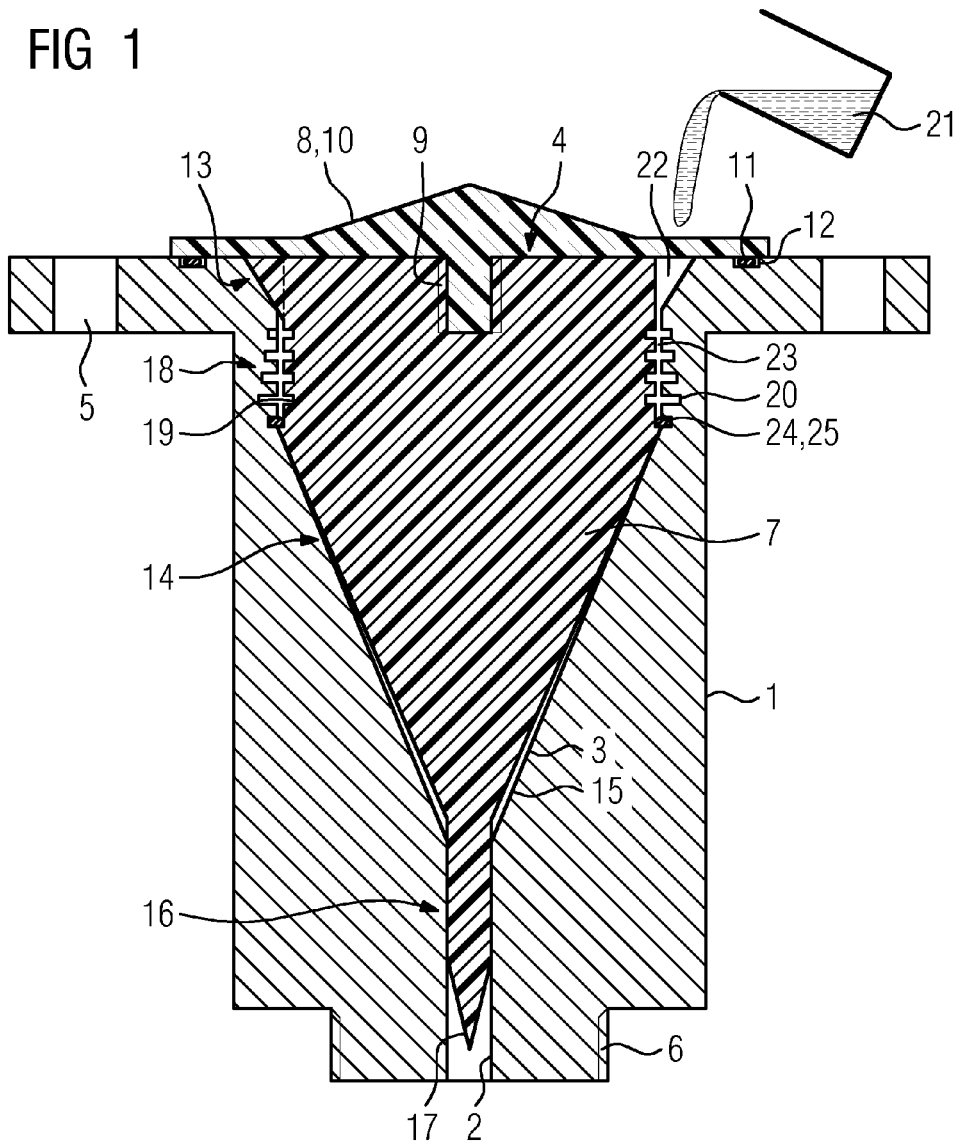
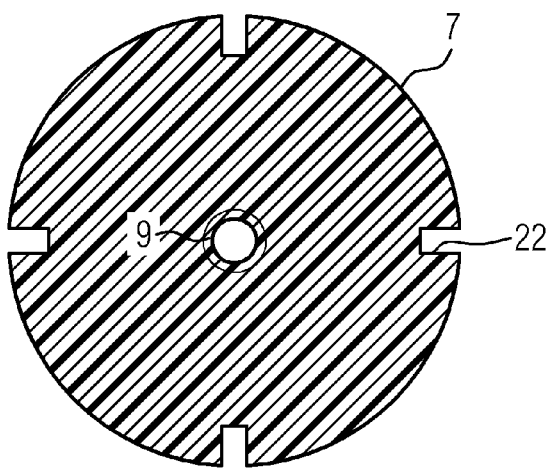

HORN ANTENNA FOR A RADAR DEVICE

BACKGROUND OF THE INVENTION

1. Field of the Invention

The invention relates to a horn antenna for a radar device including a metal body having a hollow horn section that expands to an open end in the metal body, a dielectric filling body arranged in the hollow horn section, and a dielectric cover attached to the filling body and sealingly closing the open end of the metal body, where the dielectric filling body includes a first conical portion that is situated towards the open end of the metal body and is fittingly received in the hollow horn section, and where a second conical portion that is situated away from the open end and is dimensioned to leave a gap between itself and the wall of the hollow horn section.

2. Description of the Related Art

U.S. Pat. No. 6,661,389 discloses a horn antenna. By means of a horn antenna, which also is known as a cone antenna, microwave pulses are radiated, which have been generated by high frequency (HF) energy coupled in. In a combined transmitting and receiving system of a level measuring device equipped with such an antenna, the pulses reflected by a filling product are detected, and the distance from the filling product is assessed by measuring the transit time of these pulses. Radar-based level measuring devices are, for example, used for a continuous level measurement of fluids, as well as of bulk goods or a combination of such products.

For antennas that are not exposed to a heavy chemical load, metallic horns preferably of stainless steel are used. For highly aggressive process environments or in applications in which the filling product to be measured is, for purity or hygienic reasons, not allowed to come into contact with metal, it is known to provide a suitable encapsulated antenna.

A horn antenna comprising a metal body, preferably of aluminum, is depicted in FIG. 8 of the above-mentioned U.S. Pat. No. 6,661,389 in which a cone-like hollow horn section is formed. The metal body is screwed in the opening of a mounting flange of a vessel, where the open end or aperture of the horn section is arranged flush with the opening. The inner space of the horn section is filled with a dielectric filling body that is assembled from three different parts, where one of the parts is formed as a disk that covers and seals the opening against the environment inside the vessel and, in its middle portion, forms a convex microwave lens. The other parts are formed as a truncated cone and a pointed cone, where the pointed cone features such an outer dimension that between its outer wall and the inner surface of the horn section a minimal gap remains to compensate for expansion variations conditioned by temperature influences. The truncated cone part is bonded by adhesion with the metal body, in particular by a silicone adhesive for attachment of the dielectric filling body.

US 2009/0212996 A1 discloses another conventional horn antenna, but differing from the horn antenna described in U.S. Pat. No. 6,661,389 in that the dielectric filling body is integrally formed. The dielectric filling body has a cylindrical section that is inserted in a tubular waveguide section of the metal body and fixed at that point by sealing and locking means, thus preventing the filling body from falling out of the horn section of the horn antenna. The dielectric material of the filling body has a higher coefficient of thermal expansion than the metal body. Accordingly, a circumferential gap is provided between the outer surface of the dielectric filling body and the inner surface of the horn section. An alternative or supplemental sealing and locking element between the filling body and the metal body may be provided in the region of the aperture of the horn section. The locking element such as a round or flat wire, a Seeger ring, a retaining ring of spring steel is so formed that it does not produce disturbing microwave reflections.

SUMMARY OF THE INVENTION

It is an object of the invention to provide an attachment of a dielectric filling body in a horn antenna, where the attachment is wear and maintenance-free, stable against temperature changes and hermetically seals the interior of the antenna from the outside atmosphere.

This and other objects and advantages are achieved in accordance with the invention by providing a horn antenna in which the dielectric filling body has a third portion between the first and second portions, where the third portion and the opposite portion of the wall of the hollow horn section are provided with circumferential grooves arranged in pairs opposite each other. In accordance with the invention, the grooves are filled with a cured encapsulation material that is either dielectric or conductive. In cases in which the encapsulation material is dielectric, the depth of the circumferential grooves in the metal body is constant or increases with increasing distance from the open end of the metal body and/or in cases in which the encapsulation material is conductive, the depth of the circumferential grooves in the dielectric filling body is constant or increases with increasing distance from the open end of the metal body.

Horn antennas that have circumferential grooves with increasing depth from the mouth towards the throat of the horn are known as corrugated horn antennas (see, e.g., U.S. Pat. No. 4,106,026). Such antennas allow for a compact design and improved radiation diagram. In the horn antenna in accordance with the invention, the circumferential grooves or corrugations advantageously serve the double role of improving the microwave characteristics of the horn antenna and, in cooperation with the encapsulation material, locking the dielectric body. Depending on whether the encapsulation material is dielectric or conductive, either the circumferential grooves in the metal body or those in the filling body define the radiation characteristic of the horn antenna. As the horn antenna is not fully corrugated, costs for machining the grooves are reduced, while microwave performance is still improved by the corrugated section.

In a preferred embodiment of the invention, the third portion of the dielectric filling body and the opposite portion of the wall of the hollow horn section have an opening (apex) angle less than those of the first and second portions. Most preferably, the third portion of the dielectric filling body and the opposite portion of the wall of the hollow horn section have cylindrical shapes, which improves the mechanical strength of the antenna.

The encapsulation material may be a paste that is pressed into the circumferential grooves before the dielectric filling is inserted in the hollow horn section of the metal body. If the uncured encapsulation material is more or less fluid, the dielectric filling body has at least two blind grooves or channels that intersect with the circumferential grooves and open towards the open end of the metal body. This allows for application of the encapsulation material into the circumferential grooves after the dielectric filling body is inserted in the hollow horn section of the metal body.

The third portion of the dielectric filling body may be dimensioned to leave a gap between itself and the opposite portion of the wall of the hollow horn section to facilitate the distribution of the encapsulation material over the circumferential grooves.

To confine the encapsulation material during the pouring process, the third portion of the dielectric filling body and/or the opposite portion of the wall of the hollow horn section has an additional circumferential groove that is farther from the open end of the metal body than the other circumferential grooves and which receives a seal between the dielectric filling body and the metal body.

The first conical portion of the dielectric filling body is fittingly received in the hollow horn section and thus serves for centering and as a hard-stop to hold the filling body during the assembling and application of the encapsulation material processes. The first conical portion of the dielectric filling body also imparts the design mechanical strength of the antenna to withstand high pressure and temperatures. The centering may be facilitated and improved in that the dielectric filling body comprises a cylindrical section that is slidably engaged within a tubular waveguide section contained in the metal body and opening into the hollow horn section.

To prevent ingress of process material from the outside atmosphere to the inside of the horn antenna, the metal body or the dielectric cover may have another groove around its open end for receiving a seal between the metal body and the dielectric cover. To maximize the horn antenna gain and to minimize the reflections at the antenna/process interface, the dielectric cover preferably forms a convex microwave lens.

The dielectric cover is attached to the filling body that in turn is fixedly held in the hollow horn section of the metal body. Consequently, all points of attachment of the dielectric cover and filling body to the metal body are outside the process environment and the horn antenna is hermetically sealed against the process environment. There are no further fastening devices, such as screws, extending through the dielectric cover into the metal body that may form dirt traps and affect the radiation characteristic of the horn antenna.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention will be now described by way of example and with reference to the accompanying drawing, in which:

FIG. 1 is a longitudinal sectional view through a horn antenna in accordance with a preferred embodiment of the present invention; and FIG. 2 is a cross sectional view of the dielectric filling body in its upper portion near the dielectric cover in accordance with the preferred embodiment of the present invention.

DETAILED DESCRIPTION OF THE PREFERRED EMBODIMENTS

With reference to FIGS. 1 and 2, the horn antenna depicted comprises a cylindrical body 1 made from a metal with good conductive properties and resistant to aggressive chemicals. A tubular waveguide section 2 and an adjoining hollow horn section 3 are machined in the cylindrical metal body 1. The horn section 3 expands to an open end 4 in the cylindrical metal body 1. There, at the process interface of the antenna, the cylindrical metal body 1 has a flanged, threaded or clamped pipe type connection 5 suitable for the measurement application. At the opposite end, a threaded section 6 or other suitable attachment means is provided to connect the horn antenna to a housing of a radar level transmitter (not shown). A microwave energy signal supplied by a high frequency (HF) module of the radar level transmitter is transferred through the tubular waveguide section 2 to the horn section 3.

The hollow horn section 3 is filled with a dielectric filling body 7. The open end 4 of the cylindrical metal body 1 is closed by a dielectric cover 8 that is attached to the dielectric filling body 7 by a threaded section 9 or other alternative means of attachment. The cover 8 is made from a material impervious to process materials with good microwave properties. Suitable dielectric materials include polytetrafluoroethylene (PTFE), TFM™ PTFE, polypropylene (PP) or ceramic material. In its mid-area, the cover 8 comprises a dielectric lens 10 and can be conical in shape, while also other focalizing profiles (elliptic, parabolic, phase matched) can be used. The outer area of the cover 8 may be used as a gasket (extension of various flanged or pipe type connection couplings) to hermetically seal the process interface of the antenna. An O-ring 11 with suitable dielectric and thermal properties is placed in a groove 12 between the cover 8 and the cylindrical metal body 1 to prevent the ingress of process materials inside the antenna.

The material of the filling body 7 has a dielectric constant, preferably between 1.5 and 2.5 (but lower or higher values might be used) and low dielectric losses at microwave frequencies. Suitable dielectric materials include PTFE, syntactic foams, Ultem®, PEEK® and EXTEM®. The dielectric filling body 7 is integrally formed and subdivided into several sections or portions.

A first frusto-conical portion 13 at the aperture end of the filling body 7 is frusto-conical in shape and matches the conical horn section 3. During the assembly of the antenna, this portion 13 serves for centering and as a hard-stop to hold the filling body 7 within hollow horn section 3 of the metal body 1. Once the antenna is assembled, it imparts the design mechanical strength to withstand high pressure and temperatures.

A second conical portion 14 is situated away from the open end 4 of the cylindrical metal body 1. To allow for differential thermal expansion, this portion 14 is machined smaller (more acute-angled or smaller in diameter) than the surrounding hollow horn section 3 such that an expansion space in the form of a gap 15 is provided. To ensure a smooth transition from the empty tubular waveguide section 2 to the filled horn section 3, the conical portion 14 of the dielectric filling body 7 projects inside the waveguide section 2 with a short cylindrical section 16 and ends with a conical tip 17. The cylindrical section 16 is slidably engaged within the tubular waveguide section 2 and also serves as centering means for the dielectric filling body 7. Thus, the dielectric filling body 7 is at one end centered in the tubular waveguide section 2 and at the other end fittingly received in the hollow horn section 3. The dielectric filling body 7 can therefore move longitudinally to absorb the differential thermal expansion of the different antenna materials over the entire operating temperature range.

Finally, the dielectric filling body 7 has a third portion 18 between the first and second portions 13, 14. This third portion 18 has an opening angle less than those of the first and second portions 13, 14 and may have a cylindrical shape. The third portion 18 and the opposite portion of the wall of the hollow horn section 3 are provided with circumferential grooves 19, 20 that are arranged in pairs opposite to each other. The depth of the grooves 20 in the cylindrical metal body 1 is constant or increases with increasing distance from the open end 4 of the cylindrical metal body 1.

The circumferential grooves 19, 20 are filled with a dielectric encapsulation material 21, e.g., epoxy resin, which has good microwave properties and a dielectric constant as close as possible to the dielectric constant of the filling body 7. After the dielectric filling body 7 is inserted in the hollow horn section 3, the encapsulation material 21 is applied through filling channels 22 or into the circumferential grooves 19, 20. These filling channels 22 are blind grooves or channels in the filling body 7 or cylindrical metal body 1 that intersect with the circumferential grooves 19, 20 and open towards the open end 4 of the cylindrical metal body 1. To facilitate the distribution of the encapsulation material 21 over the circumferential grooves 19, 20, the third portion 18 of the dielectric filling body 7 may be machined smaller than the surrounding hollow horn section 3 such that a gap 23 is provided.

To confine the encapsulation material 21 during the application process, the third portion 18 of the dielectric filling body 7 and/or the opposite portion of the wall of the hollow horn section 3 has an additional circumferential groove 24 that is farther from the open end 4 of the cylindrical metal body 1 than the other grooves 19, 21 and which receives a seal 25, e.g., an O-ring, between the dielectric filling body 7 and the cylindrical metal body 1.

The portion of the wall of the hollow horn section 3 that contains the circumferential grooves 20 defines a corrugated horn antenna section. The spacing, width and depth of the circumferential grooves 20 are optimized for maximum microwave performance. Thus, the circumferential grooves 19, 20 advantageously improve the microwave characteristics of the antenna and, in cooperation with the cured encapsulation material 21, form a permanent lock for the cylindrical metal body 1. As the horn antenna is not fully corrugated, costs for machining the grooves 19, 20 are reduced, while microwave performance is still improved by the corrugated section.

Another option is to use a conductive encapsulation material 21, in which case the active corrugated section is formed by the grooves 19 machined in the dielectric filling body 7 with their depth constant or increasing with increasing distance from the open end 4 of the cylindrical metal body 1.

While there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A horn antenna for a radar device comprising:
a metal body having a hollow horn section which expands to an open end in the metal body;
a dielectric filling body arranged in the hollow horn section and having a first conical portion situated towards the open end of the metal body and fittingly received in the hollow horn section, a second conical portion situated away from the open end and dimensioned to leave a gap between itself and a wall of the hollow horn section, and a third portion between said first and second portions;
a dielectric cover attached to the dielectric filling body and sealingly closing the open end of the metal body; and
circumferential grooves arranged in pairs opposite each other provided in the third portion and in an opposite portion of the wall of the hollow horn section, the circumferential grooves being filled with a cured encapsulation material which is one of dielectric and conductive;
wherein a depth of the circumferential grooves in the metal body is one of constant and increases with increasing distance from the open end of the metal body if the encapsulation material is dielectric; and
wherein a depth of the circumferential grooves in the dielectric filling body is one of constant and increases with increasing distance from the open end of the metal body if the encapsulation material is conductive.

2. The horn antenna according to claim 1, wherein the third portion of the dielectric filling body and the opposite portion of the wall of the hollow horn section have an opening angle of less than an angle of the first and second portions.

3. The horn antenna according to claim 2, wherein the third portion of the dielectric filling body and the opposite portion of the wall of the hollow horn section have cylindrical shapes.

4. The horn antenna according to claim 1, wherein at least one of the dielectric filling body and the metal body includes at least two blind grooves or channels which intersect with the circumferential grooves and open towards the open end of the metal body.

5. The horn antenna according to claim 1, wherein the third portion of the dielectric filling body is dimensioned to leave a gap between itself and the opposite portion of the wall of the hollow horn section.

6. The horn antenna according to claim 1, wherein at least one of the third portion of the dielectric filling body and the opposite portion of the wall of the hollow horn section includes an additional circumferential groove which is farther from the open end of the metal body than the circumferential grooves and which receives a seal between the dielectric filling body and the metal body.

7. The horn antenna according to claim 1, wherein the metal body includes a tubular hollow waveguide section which opens into the hollow horn section; and wherein the dielectric filling body comprises a cylindrical section which is slidably engaged within the tubular waveguide section.

8. The horn antenna according to claim 1, wherein the metal body includes a further groove arranged around the open end for receiving a seal between the metal body and the dielectric cover.

9. The horn antenna according to claim 1, wherein the dielectric cover forms a convex microwave lens.

* * * * *